United States Patent
Kunitomo et al.

(10) Patent No.: US 10,788,064 B2
(45) Date of Patent: Sep. 29, 2020

(54) COMPOSITE STRUCTURE

(71) Applicant: Hitachi, Ltd., Chiyoda-ku, Tokyo (JP)

(72) Inventors: Kenichiro Kunitomo, Tokyo (JP);
Nobuya Sekiyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 875 days.

(21) Appl. No.: 15/454,073

(22) Filed: Mar. 9, 2017

(65) Prior Publication Data

US 2018/0073531 A1 Mar. 15, 2018

(30) Foreign Application Priority Data

Sep. 9, 2016 (JP) ................................ 2016-176414

(51) Int. Cl.
*F16B 5/00* (2006.01)
*B32B 7/14* (2006.01)

(52) U.S. Cl.
CPC .............. *F16B 5/0012* (2013.01); *B32B 7/14* (2013.01)

(58) Field of Classification Search
CPC ...... D03D 25/005; B29C 70/24; B29C 70/22; B29C 70/222; B29C 70/228
See application file for complete search history.

(56) References Cited

U.S. PATENT DOCUMENTS

| | | | | |
|---|---|---|---|---|
| 5,270,094 A | * | 12/1993 | Anahara | B29C 70/24 139/34 |
| 5,343,897 A | * | 9/1994 | Sakatani | B29C 70/24 139/175 |
| 5,965,223 A | * | 10/1999 | Andrews | A41D 19/01511 428/34.5 |
| 6,063,473 A | * | 5/2000 | Zafiroglu | B29C 70/24 428/317.5 |
| 6,447,886 B1 | * | 9/2002 | Mohamed | D03D 25/005 174/255 |
| 2013/0025769 A1 | * | 1/2013 | Stadtlander | B29C 70/545 156/93 |
| 2013/0216767 A1 | * | 8/2013 | Cinquin | B29C 70/228 428/102 |
| 2015/0122815 A1 | * | 5/2015 | Musciano | B32B 5/26 220/200 |

FOREIGN PATENT DOCUMENTS

| | | |
|---|---|---|
| JP | 2005-306021 A | 11/2005 |
| JP | 2009-298144 A | 12/2009 |
| JP | 2016-74116 A | 5/2016 |

* cited by examiner

*Primary Examiner* — Daniel J Wiley
(74) *Attorney, Agent, or Firm* — Crowell & Moring LLP

(57) ABSTRACT

Warping or peeling is suppressed in a composite structure of structures made of different constituent materials. Provided is a composite structure 10 obtained by joining a first structure 1 and a second structure 2 made of a different material from a material of the first structure 1, wherein a part of the second structure 2 is incorporated in a cavity 1*d* of the first structure 1, and a part of the first structure 1 is incorporated in a cavity (2*d*) of the second structure 2.

5 Claims, 6 Drawing Sheets

COMPOSITE STRUCTURE

TECHNICAL FIELD

The present invention relates to a composite structure.

BACKGROUND ART

Conventionally, a composite structure obtained by joining a plurality of types of structures having different constituent materials has been configured by joining the respective structures by surface joining. In such a composite structure, due to a difference in thermal expansion coefficient between constituent materials of the respective joined structures, thermal stress may be generated on a joining surface to cause cracking or peeling, or the entire composite structure may warp.

For example, Patent Document 1 discloses a discharge head configured to suppress warping of an entire composite structure by sintering a base substrate 200 and a piezoelectric body 58 made of materials, coefficients of thermal expansion of which are close to each other, with an individual electrodes 57 interposed therebetween.

CITATION LIST

Patent Document

Patent Document 1: JP 2005-306021 A

SUMMARY OF THE INVENTION

Problems to be Solved by the Invention

However, in the discharge head of Patent Document 1, thermal expansion coefficients of the base substrate 200 and the piezoelectric body 58 need to be conformed to each other, and materials that can be actually applied are limited. Further, in Patent Document 1, since the individual electrode 57 is simply stacked with the base substrate 200 and the piezoelectric body 58, there is a possibility that peeling may occur along with heat treatment.

Accordingly, an object of the invention is to suppress warping and peeling in a composite structure of structures made of different constituent materials.

Solutions to Problems

A preferred embodiment of a composite structure according to the invention is a composite structure obtained by joining a first structure and a second structure made of a different material from a material of the first structure, wherein a part of the second structure is incorporated in a cavity of the first structure, and a part of the first structure is incorporated in a cavity of the second structure.

Effects of the Invention

According to the invention, it is possible to suppress warping and peeling in a composite structure of structures made of different constituent materials.

MODE FOR CARRYING OUT THE INVENTION

Figure 1:
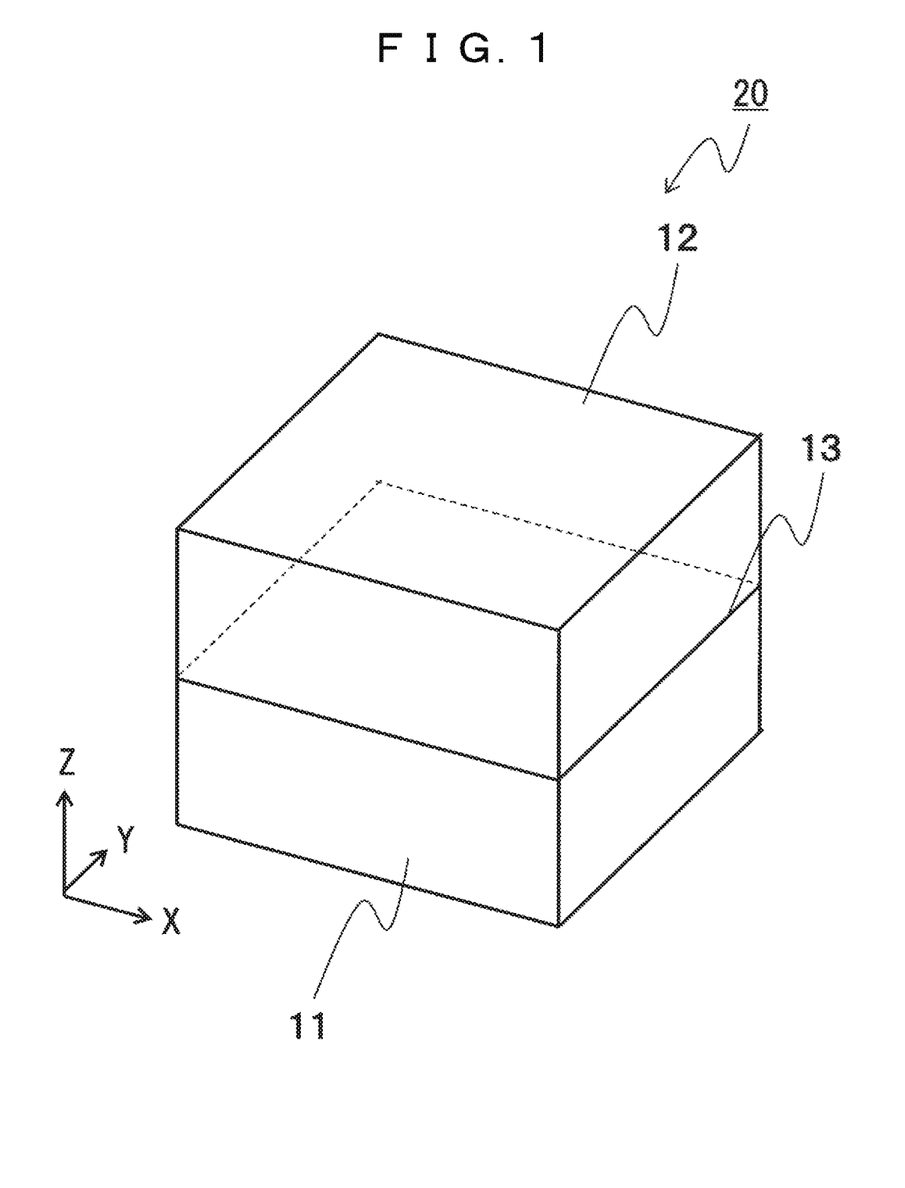
FIG. 1 is a perspective view illustrating a configuration of a conventional composite structure.

FIG. 1 is a perspective view illustrating a configuration of a conventional composite structure. As illustrated in FIG. 1, a conventional composite structure 20 is configured by joining a structure 11 and a structure 12, which are made of different constituent materials, at a joining surface 13. When the structure 11 and the structure 12 are joined and heat treated, thermal stress σ generated in an X direction and a Y direction on the joining surface 13 is expressed by the following Equation (1).

[Formula 1]

$$\sigma = E \times (T_1 - T_2) \times |\beta_1 - \beta_2| \tag{1}$$

In the above Formula (1), "E" denotes an equivalent elasticity factor in the constituent material of the structure 11 and the constituent material of the structure 12, "$\beta_1$" denotes a thermal expansion coefficient in the constituent material of the structure 11, "$\beta_2$" denotes a thermal expansion coefficient in the constituent material of the structure 12, "T1" denotes a temperature at the time of joining the structure 11 and the structure 12, and "T2" is a temperature before joining.

As shown in Formula (1), as a difference between the thermal expansion coefficient $\beta_1$ of the structure 11 and the thermal expansion coefficient $\beta_2$ of the structure 12 increases, the thermal stress generated at the joining surface 13 increases, and peeling occurs on the joining surface 13, or warping occurs in the structure 11 or the structure 12.

Embodiment 1

Figure 2A:
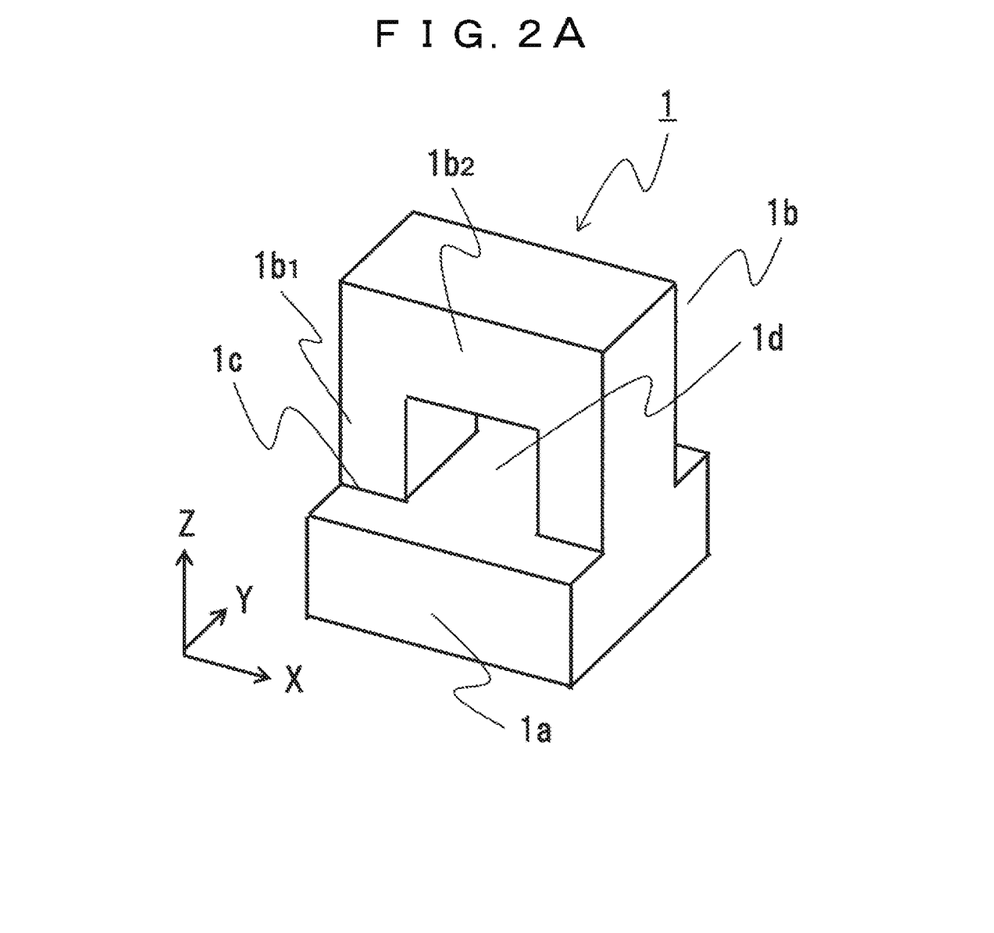
FIG. 2A is a perspective view illustrating a first structure included in a composite structure according to Embodiment 1.

Next, a composite structure according to Embodiment 1 will be described with reference to FIG. 2A and FIG. 2B. FIG. 2A is a perspective view illustrating a structure 1 corresponding to a first structure (hereinafter simply referred to as the structure 1) included in the composite structure according to Embodiment 1. As illustrated in FIG. 2A, the structure 1 includes a base 1a and a lattice 1b protruding from the base 1a. Each of the base 1a and the lattice 1b has a rectangular parallelepiped shape as a whole, and the lattice 1b is formed to be narrower than the base 1a.

In FIG. 2A, reference symbol 1c corresponds to a connecting surface between the base 1a and the lattice 1b. In more detail, the lattice 1b is integrally formed with the base 1a through the connecting surface 1c, and a cavity 1d is formed in a center portion thereof. The lattice 1b has a pair of leg portions 1b₁ erected from the base 1a and a ceiling portion 1b₂ formed between the leg portions 1b₁ so as to face the base 1a. The cavity 1d is formed in a space surrounded by the leg portions 1b₁, the ceiling portion 1b₂ and the base 1a.

Figure 2B:
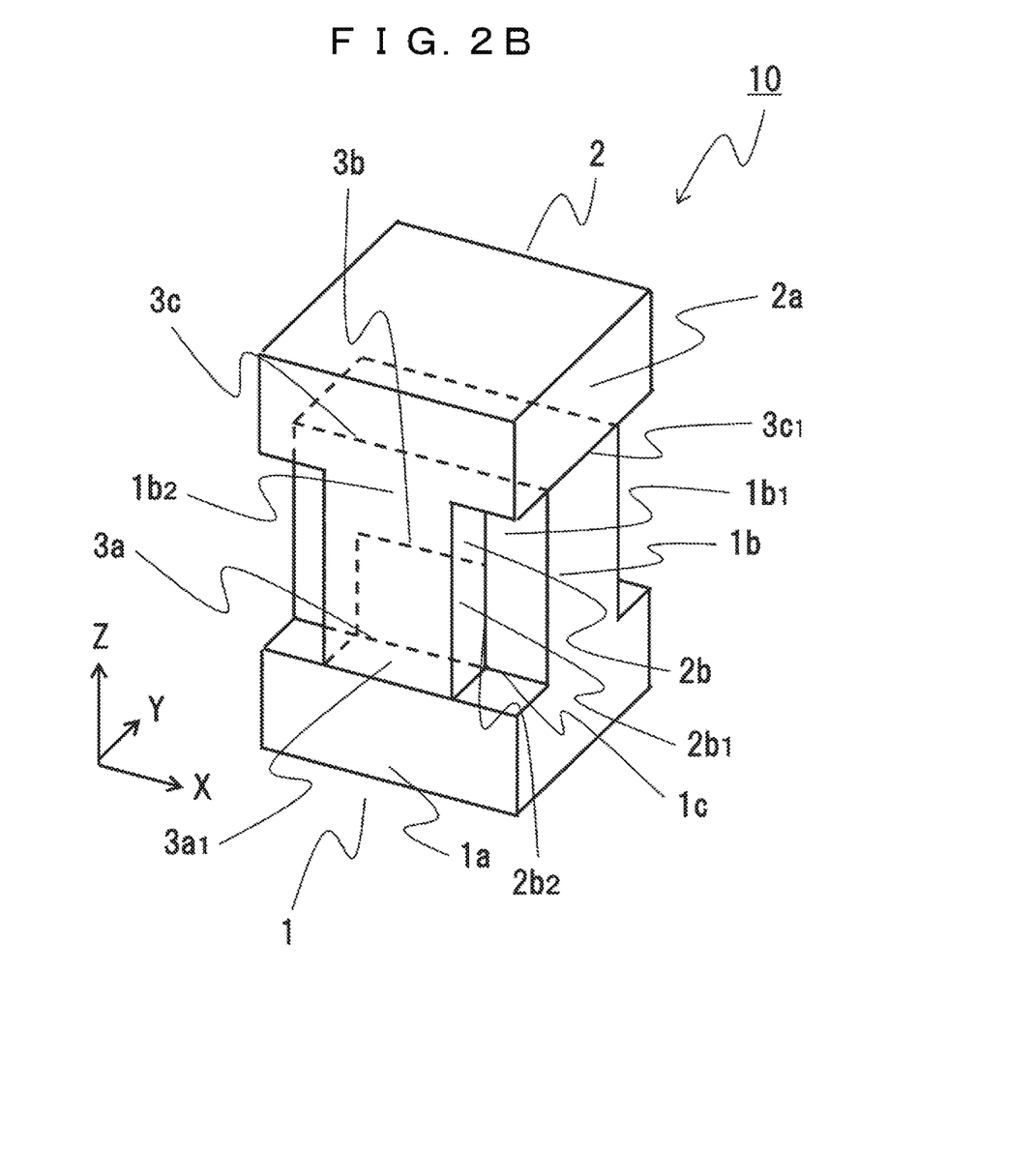
FIG. 2B is a perspective view illustrating the composite structure 10 according to Embodiment 1.

FIG. 2B is a perspective view illustrating a composite structure 10 according to Embodiment 1. The composite structure 10 is a composite structure obtained by joining the structure 1 to a structure 2 corresponding to a second structure (hereinafter simply referred to as the structure 2). The structure 2 is a structure made of a different constituent material from that of the structure 1 and has the same shape as the structure 1 (see FIG. 2A). That is, reference symbols 2a, 2b, 2b$_1$, 2b$_2$, 2c, and 2d of the structure 2 correspond to reference symbols 1a, 1b, 1b$_1$, 1b$_2$, 1c, and 1d of the structure 1, and description thereof will be omitted. For example, a metal body may be used as the structure 1 and the structure 2.

The structure 2 is joined to the structure 1 while being disposed in a z direction of FIG. 2B with respect to the structure 1 such that a protruding direction of a lattice 2b is opposite to a protruding direction of the lattice 1b of the structure 1. As illustrated in FIG. 2B, in the structure 1, the ceiling portion 1b$_2$ of the lattice 1b is incorporated in a cavity 2d of the structure 2. Further, in the structure 2, a ceiling portion 2b$_2$ of the lattice 2b is incorporated in the cavity 1d of the structure 1.

In FIG. 2B, a surface including a joining surface 3a$_1$ between the base 1a of the structure 1 and the lattice 2b of the structure 2 is indicated by a boundary surface 3a, a surface including a joining surface between the ceiling portion 1b$_2$ of the lattice 1b of the structure 1 and the ceiling portion 2b$_2$ of the lattice 2b of the structure 2 is indicated by a boundary surface 3b, and a surface including a joining surface 3c$_1$ between the base 2a of the structure 2 and the lattice 1b of the structure is indicated by a boundary surface 3c.

For example, the boundary surface 3a has the connecting surface 1c between the base 1a and the lattice 1b adjacent to the joining surface 3a$_1$ between the base 1a and the lattice 2b. As described above, in the structure 1, the base 1a and the lattice 1b are integrally formed using the same constituent material. Therefore, the boundary surface 3a has the connecting surface 1c integrally formed using a constituent material of the structure 1 adjacent to the joining surface 3a$_1$ on which dissimilar materials are joined to each other.

In a region of the connecting surface 1c integrally formed using the same constituent material, no difference in thermal expansion coefficient occurs, and thermal stress is not generated during heat treatment. For this reason, thermal stress generated during heat treatment may be reduced on the boundary surface 3a of the composite structure 10 when compared to the joining surface 13 (see FIG. 1) formed solely by a joining surface between the structure 11 and the structure 12 made of different constituent materials.

The thermal stress on the boundary surface of the composite structure 10 is calculated by Formula (2) below. In more detail, when the structure 1 and the structure 2 are subjected to heat treatment while being joined to each other in a mode illustrated in FIG. 2B, average thermal stress $\sigma_a$ generated in the X direction and the Y direction on the boundary surface 3a is expressed by the following Formula (2).

[Formula (2)]

$$\sigma_a = \sigma \times \frac{S_1}{(S_1 + S_2)} \quad (2)$$

In the above Formula (2), "$\sigma$" denotes thermal stress calculated by the above Formula (1), "S$_1$" denotes an area of the joining surface 3a$_1$ between the base 1a and the lattice 2b, and "S2" denotes an area of the connecting surface 1c between the base 1a and the lattice 1b of the structure 1.

Considering a shape of the composite structure 10 associated with the above Formula (2), since both S$_1$ and S$_2$ are positive values, a relationship of Formula (3) below holds for an area ratio S$_1$/(S$_1$+S$_2$).

[Formula (3)]

$$\frac{S_1}{(S_1 + S_2)} < 1 \quad (3)$$

From the above, the average thermal stress a on the boundary surface 3a in the composite structure 10 is reduced when compared with the thermal stress $\sigma$ on the joining surface 13 in the conventional composite structure 20. The above-mentioned point holds true for the boundary surface 3b and the boundary surface 3c.

As described above, in the composite structure 10 of Embodiment 1, a part of the structure 2 is incorporated in the cavity 1d of the structure 1, and a part of the structure 1 is incorporated in the cavity 2d of the structure 2. Thus, both the structures 1 and 2 are joined in a state in which a positional relationship thereof is constrained. For this reason, during heat treatment of the composite structure 10, it is possible to suppress deformation of the structure 1 or the structure 2, peeling of both the structures associated with the deformation, and warping of the entire composite structure 10.

Further, as described above, since the composite structure 10 has a region (for example, the connecting surface 1c) integrally formed using the same constituent material on the boundary surfaces 3a, 3b, and 3c, thermal stress applied to the whole respective boundary surfaces is reduced during heat treatment. In this way, thermal stress applied to the structure 1 and the structure 2 forming each boundary surface is reduced, and thus it is possible to suppress deformation of the structure 1 and the structure 2, peeling of both the structures associated with the deformation, warping of the entire composite structure 10, and a crack of the structure 1 and the structure 2.

Embodiment 2

Figure 3A:
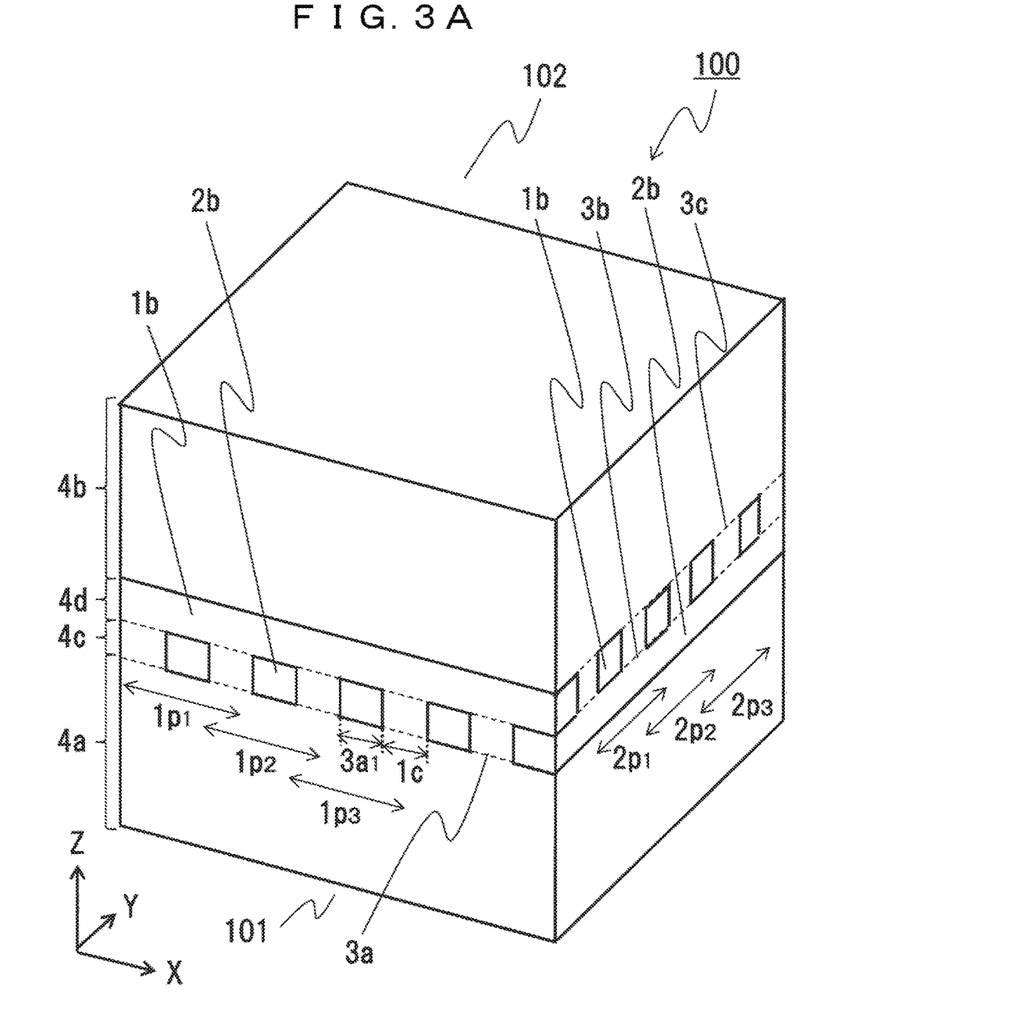
FIG. 3A is a perspective view illustrating a composite structure 100 according to Embodiment 2.

Next, a description will be given of a composite structure 100 according to Embodiment 2 with reference to FIG. 3A and FIG. 3B. FIG. 3A is a perspective view illustrating the composite structure 100 of Embodiment 2. The composite structure 100 includes a structure 101 and a structure 102.

Figure 3B:
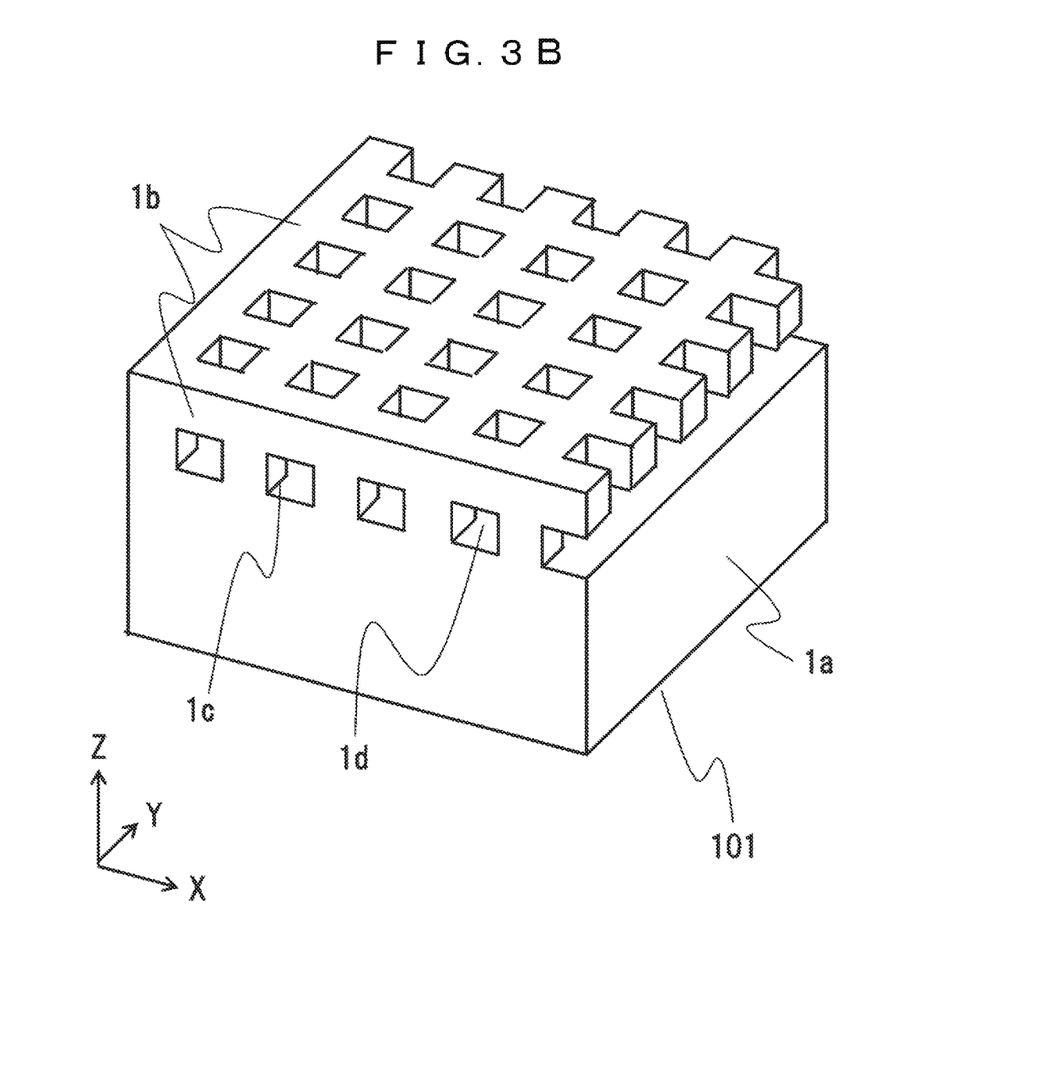
FIG. 3B is a diagram separately illustrating a structure 101 included in the composite structure 100.

FIG. 3B separately illustrates a configuration of the structure 101.

The structure 101 is obtained by connecting structures 1 illustrated in FIG. 2A in an x direction a y direction of FIG. 3A. Hereinafter, in FIG. 3A, units corresponding to the structure 1 illustrated in FIG. 2A will be denoted as unit structures 1p$_1$, 1p$_2$, ..., 1p$_n$. For example, the unit structure 1p$_2$ adjacent to the unit structure 1p$_1$ is connected to the unit structure 1p$_2$ while sharing a part of the lattice 1b of the unit structure 1p$_1$. Thereafter, similarly thereto, the unit structures 1p$_1$, 1p$_2$, ..., 1p$_n$ are connected in the x direction and the y direction to form the structure 101.

The structure 102 is a structure made of a different constituent material from that of the structure 101, and has the same shape as that of the structure 101. That is, reference symbols 2p$_1$, 2p$_2$, ..., 2p$_n$ of the structure 102 correspond to reference symbols $1p_1$, $1p_2$, . . . , $1p_n$, and description thereof will be omitted. Similarly to Embodiment 1, for example, a metal body may be used as the structure 101 and the structure 102.

The structure 102 is joined to the structure 101 while being disposed in a z direction of FIG. 3A with respect to the structure 101 such that a protruding direction of a lattice $2b$ of each unit structure $2p_n$ is opposite to a protruding direction of a lattice $1b$ of each unit structure $1p_n$ of the structure 101.

As illustrated in FIG. 3A, in the structure 101, a ceiling portion $1b_2$ of the lattice $1b$ of each unit structure $1p_n$ is incorporated in a cavity $2d$ of each unit structure $2p$, of the structure 102. Further, in the structure 102, a ceiling portion $2b_2$ of the lattice $2b$ of each unit structure $2p_n$ is incorporated in a cavity $1d$ of each unit structure $1p_n$ of the structure 101. In this way, the composite structure 100 is formed as a structure obtained by connecting a plurality of unit structures corresponding to the composite structure 10 illustrated in FIG. 2B.

In FIG. 3A, a layer in which the lattice $2b$ of each unit structure $2p_n$ of the structure 102 is formed inside the cavity $1d$ of each unit structure $p_n$, of the structure 101 is set to a mixed layer $4c$, and a layer in which the lattice $1b$ of each unit structure $1p_n$ of the structure 101 is formed inside the cavity $2d$ of each unit structure $2p_n$ of the structure 102 is set to a mixed layer $4d$. In addition, in the structure 101, a layer formed by a connecting body of a base $1a$ of each unit structure $1p_n$ is set to a first monolayer $4a$. In the structure 102, a layer formed by a connecting body of a base $2a$ of each unit structure $2p_n$ is set to a second monolayer $4b$. In addition, a boundary surface $3a$ is set between the monolayer $4a$ and the mixed layer $4c$, a boundary surface $3b$ is set between the mixed layer $4c$ and the mixed layer $4d$, and a boundary surface $3c$ is set between the mixed layer $4d$ and the monolayer $4b$.

As illustrated in FIG. 3A, for example, on the boundary surface $3a$, the composite structure 100 alternately has a joining surface $3a_1$ between the lattice $2b$ of each unit structure $2p_r$ and the monolayer $4a$ (base $1a$) and a connecting surface $1c$ between the lattice $1b$ of each unit structure $1p_n$ and the monolayer $4a$ (base $1a$).

As described above, in the structure 101, the lattice $1b$ of each unit structure $1p_n$ and the monolayer $4a$ (base $1a$) are integrally formed using the same constituent material. Therefore, the boundary surface $3a$ has the connecting surface $1c$ integrally formed using a constituent material of the substrate 101 adjacent to the joining surface $3a_1$ on which different materials are joined to each other.

In a region of the connecting surface $1c$ integrally formed using the same constituent material, no difference in thermal expansion coefficient occurs, and thermal stress is not generated during heat treatment. For this reason, thermal stress generated during heat treatment may be reduced as a whole on the boundary surface $3a$ of the composite structure 100 when compared to the joining surface 13 (see FIG. 1) formed solely by the joining surface between the structure 11 and the structure 12 made of different constituent materials.

Similarly to Embodiment 1, thermal stress on the boundary surface of the composite structure 100 is calculated by the above Formula (2). In more detail, when the structure 1 and the structure 2 are subjected to heat treatment while being joined to each other in a mode illustrated in FIG. 3A, average thermal stress $\sigma_a$ generated in the X direction and the Y direction on the boundary surface $3a$ is expressed by the above Formula (2).

In the above Formula (2), "$S_1$" denotes a sum of areas of joining surfaces $3a_1$ between lattices $2b$ of respective unit structures $2p_n$ and monolayers $4a$ (bases $1a$), and "$S_2$" denotes a sum of areas of connecting surfaces $1c$ between lattices $1b$ of respective unit structures $1p_n$ and monolayers $4a$ (bases $1a$). In Embodiment 2, considering a shape of the composite structure 100, since both $S_1$ and $S_2$ are positive values, a relationship of the above Formula (3) holds for an area ratio $S_1/(S_1+S_2)$.

From the above, the average thermal stress $\sigma_a$ on the boundary surface $3a$ in the composite structure 100 is reduced when compared with the thermal stress $\sigma$ on the joining surface 13 in the conventional composite structure 20. The above-mentioned point holds true for the boundary surface $3b$ and the boundary surface $3c$.

As described above, in the composite structure 100, the structure 101 and the structure 102 are joined in a state in which a positional relationship thereof is constrained. Thus, during heat treatment of the composite structure 100, it is possible to suppress deformation of the structure 101 or the structure 102, peeling of both the structures associated with the deformation, and warping of the entire composite structure 100.

Further, since the composite structure 100 has a region (for example, the connecting surface $1c$) integrally formed using the same constituent material on the boundary surfaces $3a$, $3b$, and $3c$, thermal stress applied to the whole respective boundary surfaces is reduced during heat treatment. In this way, thermal stress applied to the structure 101 and the structure 102 forming each boundary surface is reduced, and thus it is possible to suppress deformation of the structure 101 and the structure 102, peeling of both the structures associated with the deformation, warping of the entire composite structure 100, and a crack of the structure 101 and the structure 102.

In addition, the composite structure 100 of Embodiment 2 has configuration in which a plurality of unit structures corresponding to the composite structure 10 illustrated in FIG. 2B is connected, and thus it is possible to obtain an effect that thermal stress is reduced in a wide range of the composite structure.

As illustrated in FIG. 2B and FIG. 3A, it is preferable to use structures having the same shape as the respective joined structures since the composite structure may be easily and efficiently manufactured, and stable structures may be obtained in the obtained composite structure. However, the composite structure may be manufactured using structures having different shapes as the respective structures.

In addition, as illustrated in FIG. 2B and FIG. 3A, it is preferable to dispose a part of a lattice of each structure inside a cavity of another structure substantially without any gap since stable structures may be obtained in the composite structure. However, the composite structure may be manufactured in a state in which a gap is formed between the cavity and the lattice.

In addition, FIG. 2B and FIG. 3A illustrate an example in which a structure having a cavity whose cross-sectional shape is a rectangular shape is used as each structure. However, for example, a structure having a cavity whose cross-sectional shape is a circular shape, a triangular shape, etc. other than the rectangular shape may be used.

Figure 4:
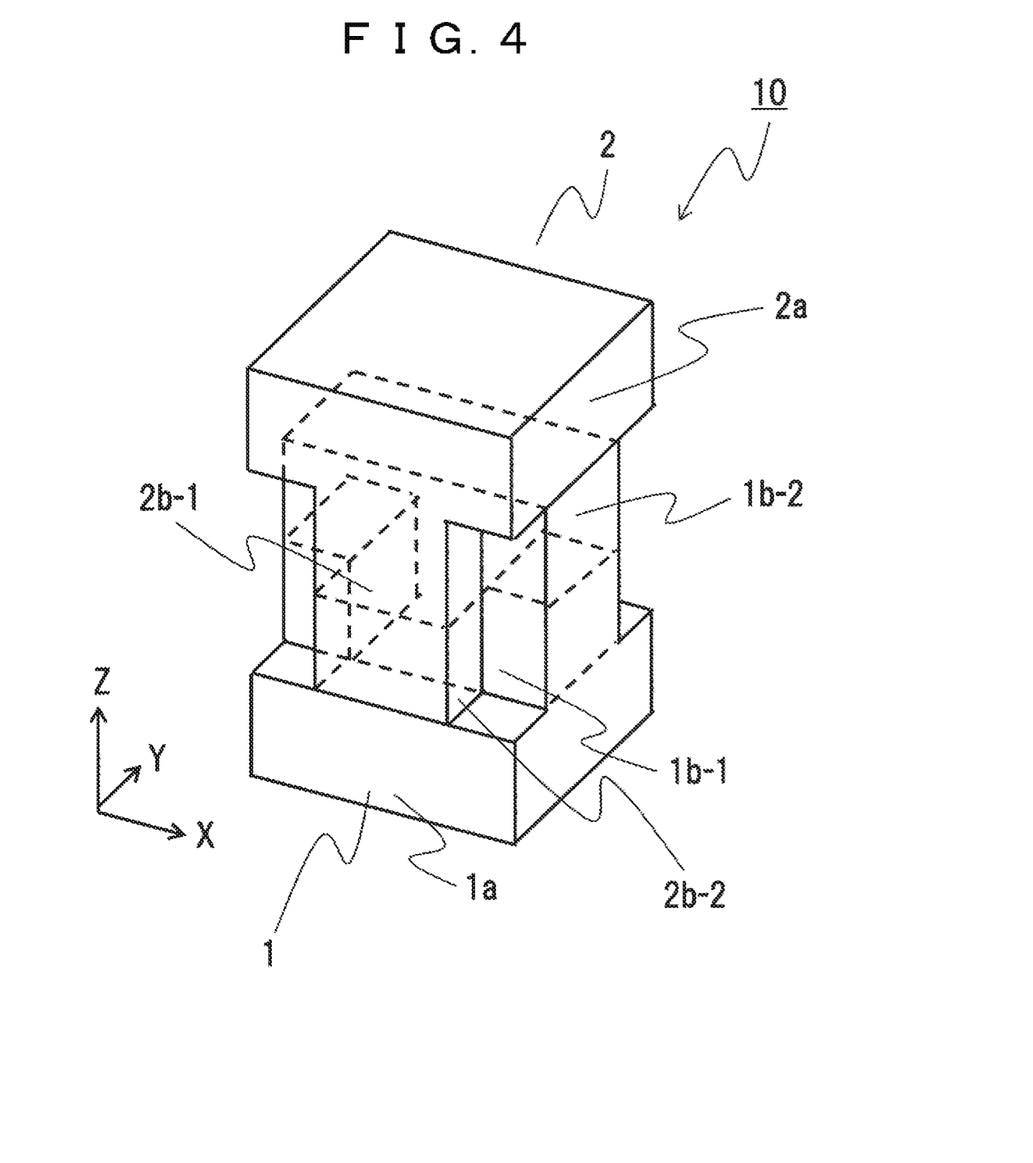
FIG. 4 is a diagram for description of a method of manufacturing the composite structure 10.

Next, a description will be given of a method of manufacturing the composite structure 10 illustrated in FIG. 2B with reference to FIG. 4. First, a lower region $1b$-1 of the lattice $1b$ is formed on the base $1a$ using built-up welding. The lower region $1b$-1 of the lattice $1b$ is formed at a position corresponding to a position illustrated in FIG. 4 on the base 1a. Subsequently, an upper region 2b-2 of the lattice 2b is formed using built-up welding from one end side to the other end side of the base 1a to fill a region sandwiched by the lower region 1b-1 of the lattice 1b.

Subsequently, a lower region 2b-1 of the lattice 2b is formed on the base 2a using built-up welding. The lower region 2b-1 of the lattice 2b is formed at a position corresponding to a position illustrated in FIG. 4 on the base 2a. Subsequently, an upper region 1b-2 of the lattice 1b is formed using built-up welding from one end side to the other end side of the base 2a to fill a region sandwiched by the lower region 2b-1 of the lattice 2b.

Subsequently, the composite structure 10 is obtained by joining the base 1a and the base 2a such that built-up welding surfaces face each other.

The invention claimed is:

1. A composite structure obtained by joining
   a first structure and
   a second structure made of a different material from a material of the first structure,
   wherein a part of the second structure is incorporated in a cavity of the first structure, and a part of the first structure is incorporated in a cavity of the second structure,
   wherein each of the first structure and the second structure has a base and a lattice protruding from the base, and
   wherein each of the base and the lattice of the first structure and the second structure has a rectangular parallelepiped shape.

2. The composite structure according to claim 1, wherein the composite structure has a region integrally formed using a constituent material of one of the first structure or the second structure within a surface including a joining surface between the first structure and the second structure.

3. The composite structure according to claim 1,
   the lattice has a pair of leg portions erected from the base and a ceiling portion formed between the leg portions so as to face the base, and
   the cavity is formed in a space surrounded by the leg portions and the ceiling portion.

4. The composite structure according to claim 3,
   wherein the ceiling portion of the first structure is incorporated in the cavity of the second structure, and
   the ceiling portion of the second structure is incorporated in the cavity of the first structure.

5. A composite structure obtained by connecting a plurality of unit structures corresponding to the composite structure according to claim 1.

* * * * *